(12) United States Patent
Fay et al.

(10) Patent No.: US 7,398,241 B2
(45) Date of Patent: Jul. 8, 2008

(54) METHOD AND SYSTEM FOR PORTABLE RETIREMENT INVESTMENT

(75) Inventors: Mary M. Fay, Richmond, VA (US);
Paul Haley, Glen Allen, VA (US);
Vickey Root, Richmond, VA (US);
Matthew Sharpe, Glen Allen, VA (US);
Geoffrey Stiff, Richmond, VA (US)

(73) Assignee: Genworth Financial, Inc., Richmond, VA (US)

(*) Notice: Subject to any disclaimer, the term of this patent is extended or adjusted under 35 U.S.C. 154(b) by 1435 days.

(21) Appl. No.: 09/876,053

(22) Filed: Jun. 8, 2001

(65) Prior Publication Data

US 2002/0188540 A1 Dec. 12, 2002

(51) Int. Cl.
*G06Q 40/00* (2006.01)
(52) U.S. Cl. .............................. 705/36; 705/35; 705/37; 705/38
(58) Field of Classification Search ............. 705/35–37, 705/38
See application file for complete search history.

(56) References Cited

U.S. PATENT DOCUMENTS

| | | | |
|---|---|---|---|
| 4,055,757 A | 10/1977 | Tillman et al. | |
| 4,742,457 A | 5/1988 | Leon et al. | |
| 4,750,121 A | * 6/1988 | Halley et al. ................... | 705/35 |
| 4,969,094 A | * 11/1990 | Halley et al. ............... | 705/36 R |
| 5,291,398 A | 3/1994 | Hagan | |
| 5,631,828 A | 5/1997 | Hagan | |
| 5,864,685 A | 1/1999 | Hagan | |

(Continued)

FOREIGN PATENT DOCUMENTS

EP 0 621 556 10/1994

(Continued)

OTHER PUBLICATIONS

"New Variable Annuity Features Provide Value, but at a Cost", located at http://www.insure.com/life/annuity/newerfeatures.html.

(Continued)

*Primary Examiner*—Nga B. Nguyen
(74) *Attorney, Agent, or Firm*—Hunton & Williams

(57) ABSTRACT

A process and a system for providing a user with a plurality of periodic retirement income payments is disclosed. The process comprises the steps of receiving an input including two of a retirement date, a minimum retirement income amount and a defined premium payment amount for payment over a plurality of preset payment intervals. The process also includes the steps of calculating the other one of the retirement date, the minimum retirement income amount and the defined premium payment amount for an accumulation period defined by the retirement date and a current age of the user; receiving a premium payment amount from the user during the accumulation period; investing the received premium payment amount in an account in a manner consistent with one or more predefined objectives during the accumulation period to realize a retirement income amount. The process further includes the step of transmitting the retirement income amount to at least one of the user and a designated receiver at a designated time after the end of the accumulation period. The retirement income amount includes a predetermined guaranteed minimum retirement income if the received premium payments are received according to a preset premium payment schedule.

25 Claims, 4 Drawing Sheets

U.S. PATENT DOCUMENTS

| | | |
|---|---|---|
| 5,878,405 A | 3/1999 | Grant et al. |
| 5,893,071 A | 4/1999 | Cooperstein |
| 5,911,135 A | 6/1999 | Atkins |
| 5,926,792 A | 7/1999 | Koppes |
| 5,930,760 A | 7/1999 | Anderton et al. |
| 5,933,815 A | 8/1999 | Golden |
| 5,999,917 A | 12/1999 | Facciani et al. |
| 6,012,043 A | 1/2000 | Albright et al. |
| 6,021,397 A | 2/2000 | Jones et al. |
| 6,049,772 A | 4/2000 | Payne |
| 6,052,673 A | 4/2000 | Leon et al. |
| 6,064,969 A | 5/2000 | Haskins |
| 6,064,983 A | 5/2000 | Koehler |
| 6,064,986 A | 5/2000 | Edelman |
| 6,085,174 A | 7/2000 | Edelman |
| 6,275,807 B1 | 8/2001 | Schirripa |
| 6,282,520 B1 | 8/2001 | Schirripa |
| 6,343,272 B1 | 1/2002 | Payne |
| 6,592,030 B1 | 7/2003 | Hardesty |
| 6,611,807 B1 | 8/2003 | Bernheim et al. |
| 6,611,808 B1 | 8/2003 | Preti |
| 6,611,815 B1 | 8/2003 | Lewis |
| 6,615,180 B1 | 9/2003 | Anderton |
| 6,625,582 B2 | 9/2003 | Richman et al. |
| 6,636,834 B1 | 10/2003 | Schirripa |
| 6,947,904 B1 | 9/2005 | Macey |
| 6,950,805 B2 | 9/2005 | Kavanaugh |
| 6,963,852 B2 | 11/2005 | Koresko |
| 6,999,935 B2 | 2/2006 | Parankirinathan |
| 7,016,871 B1 | 3/2006 | Fisher |
| 7,039,593 B2 | 5/2006 | Sager |
| 7,089,201 B1 | 8/2006 | Dellinger et al. |
| 7,113,913 B1 | 9/2006 | Davis et al. |
| 7,120,601 B2 | 10/2006 | Chen |
| 7,149,712 B2 | 12/2006 | Lang |
| 7,249,037 B2 | 7/2007 | Koppes et al. |
| 7,249,077 B2 | 7/2007 | Williams et al. |
| 7,251,623 B1 | 7/2007 | Ryan et al. |
| 7,376,608 B1 | 5/2008 | Dellinger et al. |
| 2001/0014873 A1 | 8/2001 | Henderson et al. |
| 2001/0037276 A1 | 11/2001 | Kelly et al. |
| 2002/0035527 A1 | 3/2002 | Corrin |
| 2002/0077866 A1 | 6/2002 | Javerlhac |
| 2002/0077868 A1 | 6/2002 | Javerlhac |
| 2002/0087365 A1 | 7/2002 | Kavanaugh |
| 2002/0116311 A1 | 8/2002 | Chalke et al. |
| 2002/0138386 A1 | 9/2002 | Maggioncalda et al. |
| 2002/0184129 A1 | 12/2002 | Arena et al. |
| 2002/0194098 A1 | 12/2002 | Stiff et al. |
| 2002/0198802 A1 | 12/2002 | Koresko |
| 2003/0004844 A1 | 1/2003 | Hueler |
| 2003/0014285 A1 | 1/2003 | Richard |
| 2003/0033172 A1 | 2/2003 | Menke |
| 2003/0065539 A1 | 4/2003 | Kay |
| 2003/0088430 A1 | 5/2003 | Ruark |
| 2003/0088512 A1 | 5/2003 | Hoter-Ishay |
| 2003/0093303 A1 | 5/2003 | Pooler |
| 2003/0135396 A1 | 7/2003 | Javerlhac |
| 2003/0191672 A1 | 10/2003 | Kendall |
| 2003/0233301 A1 | 12/2003 | Chen et al. |
| 2004/0078244 A1 | 4/2004 | Katcher |
| 2004/0088201 A1 | 5/2004 | Lang |
| 2004/0172350 A1 | 9/2004 | Atkinson et al. |
| 2004/0181436 A1 | 9/2004 | Lange |
| 2004/0199446 A1 | 10/2004 | Lange |
| 2005/0010453 A1 | 1/2005 | Terlizzi |
| 2005/0015282 A1 | 1/2005 | Gutman |
| 2005/0071205 A1 | 3/2005 | Terlizzi |
| 2005/0144124 A1 | 6/2005 | Stiff et al. |
| 2005/0149425 A1 | 7/2005 | Hagan |
| 2005/0154658 A1 | 7/2005 | Bove et al. |
| 2005/0187840 A1 | 8/2005 | Stiff et al. |
| 2005/0216316 A1 | 9/2005 | Brisbois |
| 2005/0234747 A1 | 10/2005 | Kavanaugh |
| 2005/0234821 A1 | 10/2005 | Benham |
| 2006/0026036 A1 | 2/2006 | Mahmood |
| 2006/0041453 A1 | 2/2006 | Clark |
| 2006/0041455 A1 | 2/2006 | Dehais |
| 2006/0059020 A1 | 3/2006 | Davidson |
| 2006/0085338 A1 | 4/2006 | Stiff et al. |
| 2006/0143055 A1 | 6/2006 | Loy et al. |
| 2007/0021986 A1 | 1/2007 | Cheung et al. |
| 2007/0038481 A1 | 2/2007 | Darr |
| 2007/0038487 A1 | 2/2007 | McCarthy |
| 2007/0078690 A1 | 4/2007 | Kohl |
| 2007/0094053 A1 | 4/2007 | Samuels |
| 2007/0094054 A1 | 4/2007 | Crabb |
| 2007/0136164 A1 | 6/2007 | Roti et al. |
| 2007/0143199 A1 | 6/2007 | Stiff et al. |
| 2007/0168235 A1 | 7/2007 | Livingston et al. |
| 2007/0185741 A1 | 8/2007 | Hebron et al. |
| 2007/0214022 A1 | 9/2007 | Hagelman et al. |
| 2007/0214071 A1 | 9/2007 | Stone |

FOREIGN PATENT DOCUMENTS

| | | |
|---|---|---|
| WO | WO 98/22936 | 5/1998 |
| WO | WO 00/13118 | 3/2000 |
| WO | WO 00/14664 | 3/2000 |
| WO | WO 01/20512 | 3/2001 |
| WO | WO 01/88834 | 11/2001 |
| WO | WO 02/067096 A2 | 8/2002 |
| WO | WO 2004/099943 | 11/2004 |

OTHER PUBLICATIONS

"Getting Out of Your Annuity", by M. Cybulski, located at http://www.insure.com/life/annuity/basics.html.

"The Ups and Downs of Immediate Variable Annuities", by M. Cybulski, located at http://www.insure.com/life/annuity/getout.html.

"The Basics of Annuities", by M. Cybulski, located at http://www.insure.com/life/annuity/immediate.html.

"Notification of Transmittal of the International Search Report or the Declaration" from International Application No. PCT/US02/16471 mailed Dec. 10, 2002.

International Search Report dated May 4, 2004 for Application No. PCT/US03/05696.

Brown et al., Joint life annuities and annuity demand by married couples, Journal of Risk and Insurance, 67, 4, 527, Dec. 2000.

Financial Services Report, vol. 7, No. 10, May 9, 1990, Planco provides marketing services include colonial penn's popular annuity.

New York Life Introduces Lifestages® Elite Variable Annuity, New York Life, Oct. 1, 2003, 3 pages, http://www.newyorklife.com/cda/0,3254,12212,00.html.

New York Life Unveils Lifetime Income Product Featuring Liquidity, Inflation Protection, and Legacy Options, New York Life, 3 pages, http://www.newyorklife.com/cda/0,3254,12346,00.html.

Prudential Introduces Income Bridge Approach to Retirement Planning, Business Wire, Mar. 15, 2004, 1 pg.

Prudential Retirement Expands Patent-Pending Income Bridge Approach(R) to Help Maximize Social Security Benefits to Retail Clients: New Report Unveiled on Helping to Maximize Social Security Benefits, Business Wire, 2006, 2 pgs.

Ibbotson Seeks Partnerships For Combined Fund, Annuity, Defined Contribution & Savings Plan Alert, Euromoney Institutional Investor PLC, Nov. 10, 2006, 1 pg.

Lincoln Financial Group Enhances Variable Annuity Option Lincoln SmartSecurity(SM) Advantage To Offers Guaranteed Lifetime Income for Both Investor and Spouse, PR Newswire Association LLC, Nov. 6, 2006, 3 pgs.

Lincoln Financial Group's i4Life® Advantage Reaches Milestone as Elections Cross $1.0 Billion in 2006 Sales; Straight Record-Breaking Quarter, PR Newswire Association LLC, Nov. 6, 2006, 3 pgs.

Prudential Responds to 'Retirement Revolution' with Innovative, Patent-Pending Guaranteed-Income Product, Business Wire, Dec. 13, 2006, 3 pgs.

DeBaise, Insurers Add a Twist to Annuity Offerings, The Wall Street Journel.online (www.WSJ.com), Jan. 5, 2006, 4 pgs.

New York Life Brings Longevity Protection to Immediate Annuities: New Option Allows Clients to Customize retirement Payments According to Personal Needs and Life Events, Business Wire, Oct. 6, 2005, 2 pgs.

Lavine, New York Life Annuity Builds on Two Popular Features: Expects New Product to Attract $200 Million Within a Year, Annuity Market News, Thomson Media Inc. Feb. 1, 2005, 2 pgs.

American Express Financial Group Launches Annuities Feature Designed to Help Investors "Fight Off the Bears and Run With the Bulls", Business Wire, May 3, 2005, 2 pgs.

Golden Rule Insurance Company Receives Patent For Its Life/Long-Term Care Insurance Concept, PR Newswire, Jul. 15, 2003, 1 pg.

Hogan, 401 (k) Provider Offers Guaranteed Income, www.ignites.com, Apr. 14, 2005, 2 pgs.

Tergesen, New Wrinkles For Annuities, BusinessWeek, Jul. 24, 2006, 4 pgs.

McEvoy, Replacing Insurance Policies Can Be Tricky, State Journal Register, Jan. 29, 1995, 2 pgs.

Fraser, Short Takes: Discover Brokerage Top 10 Stocks, American Broker, vol. 164 Issue 40 Mar. 1, 1999, 1 pg.

* cited by examiner

METHOD AND SYSTEM FOR PORTABLE RETIREMENT INVESTMENT

BACKGROUND OF THE INVENTION

Up until about 1870, more than half of the United States' adult workers were farmers. These adult workers were typically engaged in their occupations until their death or until their health prevented them from continuing their occupations. It was uncommon to have a prolonged retirement period before a worker's death.

After 1870, however, industry developed rapidly and the economy tended increasingly to be characterized by industrialization and urbanization. The result was that workers increasingly were employed in more industry-related jobs and became more dependent upon a continuing flow of monetary income to provide for themselves and their families. Additionally, the average life expectancies of workers began to increase significantly. It became more common for workers to retire from employment and to survive for longer periods of time following their retirements. Retirement programs began to take hold. The Social Security program was introduced in 1935 and had an old age insurance component which provided a lump sum benefit for workers at age 65. At that time, the average life expectancy of a worker was 68.

Currently, however, half of male workers reaching age 65 can expect to still be alive at age 82 and half of female workers reaching age 65 can expect to be alive at age 86. The Social Security program is not keeping pace with such changes. The number of employees entering the workforce has been less than the number of new retirees for the last several years and this trend is expected to increase as the "Baby Boomers" age. The Social Security Administration ("SSA") projects a shortfall in its trust fund which provides benefits to retirees beginning in 2013. The SSA believes that an immediate and permanent increase of social security payroll taxes is necessary in order to enable it to pay for the full amount of old age benefits it currently provides retirees. Now, employees and employers contribute approximately 12.4 percent of salaries to the Social Security trust fund. The SSA projects that contributions must be increased to at least 38 percent in order for its trust fund to remain fully funded. Therefore, it is becoming increasingly uncertain whether the Social Security program will continue to remain viable until the time that today's workers are ready to retire. Moreover, many retirees have found that the amount of retirement benefits to which they are entitled under the Social Security program is insufficient to enable them to maintain a desired level of comfort in their retirement. They have found a need to supplement such Social Security benefits with income from other sources.

In addition to the institution of the Social Security program in the 1930s, beginning in the early 1900s, it became increasingly more common for employers to provide their workers, or employees, with some sort of retirement benefits or pensions. These retirement benefits or pensions were originally designed, in part, to reward an employee for his/her long career with a company and to help provide an income once such employee retired. Such retirement benefits or pension plans therefore required minimum periods of employment before an employee's entitlement to the pension amount became vested. However, many such retirement benefits or pensions are not portable. In other words, if an employee leaves the employ of an employer, that employee may lose all entitlement to such retirement benefit or pension if the employee terminates his/her employment prior to the expiration of the vesting period. This was not a problem when employers first instituted such retirement benefits or pension plans as employees tended to remain employed with one employer for their entire career until they retired.

However, in today's mobile society, employees do not tend to remain employed by one employer for their entire careers. Many employees therefore lose some or all of their projected retirement benefits which may have accrued during their employ by their employers when they leave the employ of such employers.

Furthermore, in addition to the trend of a more mobile society and an increased level of employment changes, many employers are decreasing the numbers of their employees and are instead increasingly turning to non-employee labor in part to cut expenses resulting from employee benefits such as costs related to funding employee retirement plans. Thus, many individuals in the workforce today are technically not considered "employees" but instead are independent contractors for whom employment benefits such as retirement benefits are not provided. Additionally, many employers are ceasing to offer defined benefit plans altogether because of the costs. In fact, according to statistics published by the Pension Benefit Guaranty Corporation, defined benefit pension plans of employers have decreased by more than 60 percent since 1985, with the number of U.S.-based employers that offer such defined benefit pension plans decreasing from 114,000 in 1985 to less than 40,000 in 1999. Only 21.3 percent of working family heads are currently covered by an employer-funded defined retirement benefit or pension plan.

Because of the decrease in the number of employers that offer defined retirement benefit pension plans, the decrease in the number of workers entitled to employer-funded retirement benefits and also because of the increased mobility of the workforce resulting in the loss of such employer-funded benefits, many workers have started to fund their own retirement savings plans. Tax laws have enabled workers to realize tax benefits from deferring their income by putting amounts from their paychecks into such retirement savings plans. Increasingly, such employee-self-funded retirement savings plans are becoming the primary sources of income on which employees survive following retirement.

However, one disadvantage of the increased reliance upon employee-self-funded retirement savings is that these plans do not provide a level of retirement income that is guaranteed for the employee. In addition, many employees do not have any idea of an amount required to be saved in order to achieve a desired level of income to ensure a comfortable lifestyle upon their retirement. Thus, they do not contribute a sufficient amount of their salaries towards such retirement savings to provide an adequate income level to maintain the standard of living they desire upon retirement. Based on the results of the Retirement Confidence Survey sponsored by the Employee Benefits Research Institute (EBRI), the American Savings Education Council (ASEC), and Matthew Greenwald and Associates, 22 percent of all employed adult workers have saved less than $10,000 towards retirement, 50 percent have saved less than $50,000 and only 25 percent of adult workers over the age of 55 have accumulated more than $100,000.

Retirement income needs may increase in the event such retirees suffer from health-related problems. In fact, many employees today express concern that they will not have adequate funds saved to provide for themselves during their retirement in the event they suffer health-related problems after they retire. They are currently seeking some means to ensure a higher level of income saved for such crises.

Employees often do not participate in their employer-sponsored retirement savings plans which will increase the level of their savings through interest income or a return on investment. Also, many individuals lack the sophistication needed to determine the appropriate type of investment vehicle which will offer them a high return on their investment but which is also secure enough so that their savings are not placed at risk by a high-risk type of investment vehicle.

Thus, there is a need for an investment vehicle which will provide a minimum retirement income which is portable so that a worker will not lose any income vested in a fully funded investment vehicle if the worker leaves the employ of an employer or changes jobs.

There is also a need to provide a defined retirement benefit which will guarantee an individual a minimum defined income level upon the individual's retirement.

Additionally, there is a need for a retirement investment vehicle which may provide a guaranteed minimum level of retirement income and also may afford an individual an opportunity for an increase in value of the benefits provided if market performance of the retirement vehicle exceeds a predefined benchmark.

BRIEF SUMMARY OF THE INVENTION

The above-described problems and needs are addressed by the system and process of the present invention. According to one embodiment of the invention, a process for providing a user with a plurality of periodic retirement income payments is disclosed. The process comprises the steps of receiving one or more premium payments from the user during an accumulation period; and investing the received premium payments in an account in a manner consistent with one or more predefined objectives during the accumulation period and a payout period to realize a retirement income amount. The process further includes the step of transmitting the retirement income amount to at least one of the user and a designated receiver at a designated time after the end of the accumulation period. The retirement income amount includes a predetermined guaranteed minimum retirement income amount if the received premium payments are received according to a predetermined premium payment schedule, wherein one of the predetermined guaranteed minimum retirement income amount and a premium payment amount is defined by the user.

In another aspect of the invention, a quoting process is provided. The quoting process comprises the steps of receiving as an input two of a retirement date, a minimum retirement income amount and a defined premium payment amount for payment at each of a plurality of preset payment intervals; and calculating the other one of the retirement date, the minimum retirement income amount and the defined premium payment amount, wherein the user receives the minimum retirement income amount when the user reaches the retirement date if the user pays the defined premium payment amount at each of the preset payment intervals.

In yet another aspect, a process for providing a user with periodic retirement income payments is disclosed. The process comprises the steps of receiving an input including two of a retirement date, a minimum retirement income amount and a defined premium payment amount for payment at each of a plurality of preset payment intervals; calculating the other one of the retirement date, the minimum retirement income amount and the premium payment amount based on the input for an accumulation period defined by the retirement date and a current age of the user; receiving a plurality of premium payments from the user during the accumulation period; investing the received premium payments in an account in a manner consistent with one or more predefined objectives during the accumulation period to realize a retirement income amount; and transmitting the retirement income amount to at least one of the user and a designated receiver at a designated time after the end of the accumulation period wherein the retirement income amount includes a predetermined guaranteed minimum retirement income if the received premium payments are received according to a predetermined premium payment schedule, and wherein one of the predetermined minimum is retirement income amount and the premium payment amount is defined by the user.

Additionally, in another aspect, a process for investment is disclosed. The process comprises the steps of receiving a premium payment amount from a user at each of a plurality of predefined intervals over an accumulation period during employment at a first employer during a first part of the accumulation period; receiving the premium payment amounts from the user during employment at a second employer during a second part of the accumulation period; investing the received premium payment amounts during the accumulation period; and transmitting a retirement income amount to at least one of the user and a designated receiver at a designated time after the end of the accumulation period, wherein the retirement income amount includes a predetermined guaranteed minimum retirement income if the total received premium payment amounts were received according to a predetermined premium payment schedule, and wherein one of the predetermined minimum retirement income amount and the premium payment amount is defined by the user.

In still another aspect, the invention includes a quoting system. The quoting system comprises means for receiving as an input two of a retirement date, a minimum retirement income amount and a defined premium payment amount for payment at each of a plurality of preset payment intervals; and means for calculating the other one of the retirement date, the minimum retirement income amount and the defined premium payment amount, wherein the user receives the guaranteed minimum retirement income when the user reaches the retirement date if the user pays the defined premium payment amount at each of the preset payment intervals.

Additionally, in another aspect, a system for providing a user with a plurality of periodic retirement income payments is disclosed. The system comprises a variable deferred annuity module to receive a predetermined premium payment from the user at each of a plurality of predetermined payment intervals to invest the premium payments and to output an income generating payment; and a variable immediate annuity module to receive the income generating payment and to output a periodic retirement income payment amount wherein the periodic retirement income payment amount is greater than or equal to a predetermined guaranteed minimum periodic retirement income payment amount if the premium payments received are received according to a predetermined premium payment schedule, and wherein one of the predetermined minimum periodic retirement income payment amount and a premium payment amount is defined by the user.

The accompanying drawings, which are incorporated in and constitute a part of this specification, together with the description, serve to explain the principles of the invention.

DETAILED DESCRIPTION OF THE INVENTION

Figure 1:
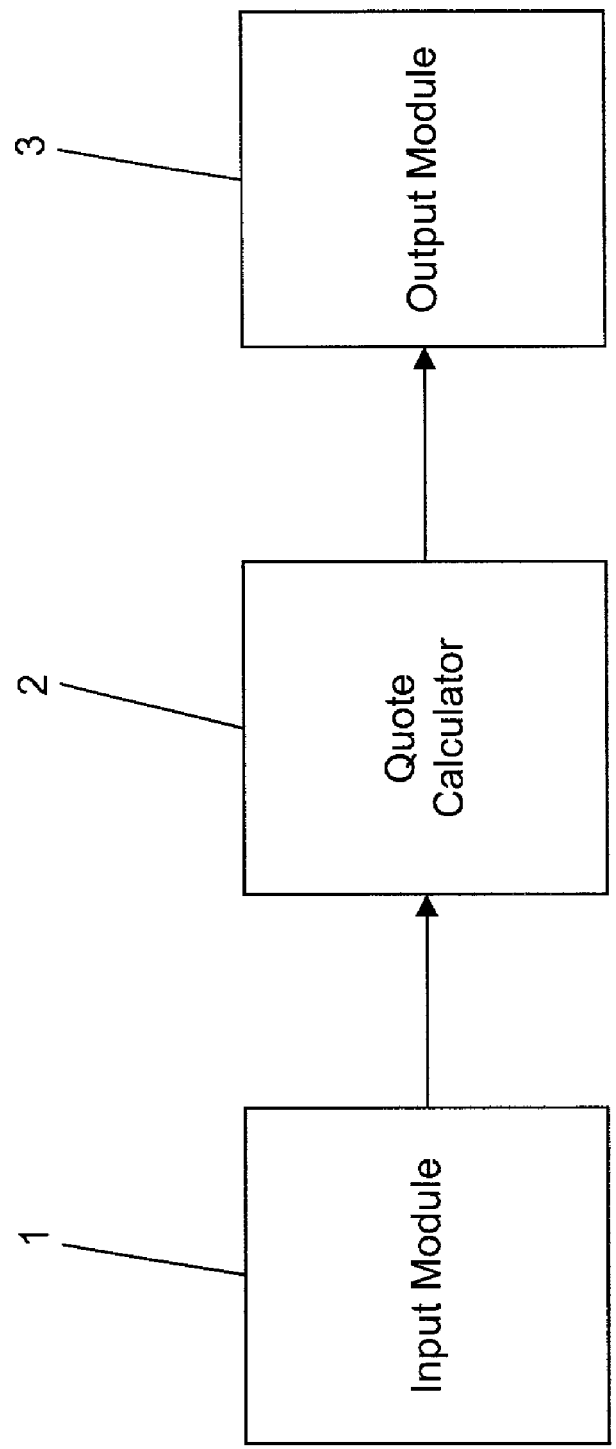
FIG. 1 is a block diagram illustrating a quoting system for a retirement benefit according to the present invention.

Reference will now be made in detail to the present preferred embodiments of the invention, examples of which are illustrated in the accompanying drawings in which like reference numerals refer to corresponding elements.

The present invention is described in relation to a portable retirement benefit annuity. Nonetheless, the characteristics and parameters pertaining to the systems and methods may be applicable to other types of annuities and other financial instruments.

An annuity is a flexible tax-deferred retirement investment product that can provide long term earnings for an investor ("user"). An annuity allows a user's retirement savings to grow on an income tax-deferred basis and allows the user to choose a payout option that best meets the user's need for income when the user retires. Payout options may include a lump sum payment, a plurality of periodic payments, income for a remainder of the user's life, or a plurality of income payments paid out over a certain period of time. The portable retirement annuity described herein will be an annuity providing a plurality of periodic income payments for the remainder of the user's life, for a period not less than a defined certain number of years, or for some combination of the two.

When a user purchases an annuity, also known as a long-term investment contract, the user typically pays an insurer an initial sum of money (called a premium or principal) and the insurer invests that principal in an investment type of financial product to earn a return on that principal. In return for the initial sum of money, or premium payment, and the use of that initial sum of money, the insurer guarantees the user either a steady stream of income payments with no upside earnings potential or a stream of income payments adjusted for market performance (but generally not both) beginning at a specified date in the future and lasting for a specified period of time. While the premium payment is invested in the investment vehicle, the premium payment grows or compounds over time, but the user does not have to pay any taxes on the earnings. This phase of an annuity contract is referred to as an accumulation period. Once the user has accumulated an amount of money the user requires for retirement, the user can begin to receive periodic income payments made from the accumulated investment premium. Only when the user begins to receive income payments are the moneys subject to taxes. One disadvantage to a typical annuity contract, however, is that it typically has a date which, if the user wishes to withdraw his/her moneys prior to such date, the user will be penalized and will have to pay the insurer a surrender charge (we will refer to this date as the "surrender charge period date"). Additionally, if the user withdraws his/her money out of the annuity investment vehicle account prior to age 59½ years, other than as a series of periodic payments, the Internal Revenue Service also requires payment of a penalty since he/she had obtained the benefit of tax-deferred treatment during the time the moneys were invested.

There are several standard types of annuity contracts which insurers offer. A fixed annuity is an annuity where the insurer guarantees the user the invested principal value and a payment of a fixed rate of return for a stated period of time on the premium payment invested during the accumulation period and a guaranteed income for life if the user "annuitizes" or converts the annuity into a stream of regular income payments. The insurer takes responsibility for investing the user's premium payment in whatever types of financial products it believes will earn enough income to enable it to meet its obligations under its guaranteed rate of return to the user. Assuming that the user holds the annuity contract until after the surrender charge period date, the benefit of such a fixed annuity contract to the user is in having a guaranteed income payment stream over a long period of time. The user is essentially betting that he/she will live a longer period of time than expected and will therefore realize a substantially higher amount of money in the guaranteed income payments than the initial premium payment. On the other hand, the insurer is betting on the opposite scenario, i.e., that it can make favorable investments of the premium payments which result in increased earnings and that the users, as a class, will not live longer than expected.

Fixed deferred annuities are popular because of their safe and predictable rates of return. Insurers often place fixed annuity contract premium payments into bonds or other conservative types of investment vehicles. Since fixed deferred annuities guarantee a specific return on the initial investment and a guaranteed return of principal, they are attractive to potential investors when the equity stock market is underperforming and interest rates are on the rise. However, under fixed deferred annuity contracts, the user is generally not advised of and does not participate in the insurer's investment choices and thus has to trust the insurer to make wise investment decisions. Moreover, under recent economic conditions, fixed deferred annuities have not been a popular choice as users have preferred to participate in the equity stock markets with the expectation of a higher rate of return on investment, but with the full knowledge that their principal may be at risk.

Variable deferred annuities have become more popular in recent years. With a variable deferred annuity contract, the user can decide how his/her premium payment will be allocated among a specific menu of investment vehicles, or sub-accounts, offered by the insurer. Sub-accounts are pooled investments of a number of users, similar to mutual funds, with varying investment objectives and strategies and typically have a professional fund manager similar to managers of mutual funds. The manager of the sub-account will decide where to invest the pooled funds based upon the objectives of the particular sub-account, e.g., growth, emerging industries, bonds, etc. The accumulated moneys in the annuity account of the user fluctuate with market values and with the user's choice of sub-accounts.

Variable deferred annuities have advantages over fixed deferred annuities since they enable the user to direct how his/her premium payment will be invested among one or more sub-accounts. Moreover, variable deferred annuities could potentially enable the user to earn more money on the initial investment than he/she could with a fixed deferred annuity contract if the user selected strong sub-accounts with high rates of return on investment. However, the variable deferred annuity contract makes no guarantees to the user regarding the amounts earned on the premium invested, the value of invested principal or the income amount to be paid out after the accumulation period, so the user could also potentially end up earning less money than desired if the sub-accounts selected by the user are weak or perform poorly. Since the value of the variable deferred annuity is tied to the risks inherent in the stock market, a downturn in the stock market could cause the value of the variable deferred annuity to drop. Thus, variable deferred annuities are not desirable to those users who are risk averse.

There are also fixed immediate annuity contracts. Purchasing a fixed immediate annuity requires a lump sum premium payment. The amount of retirement income is determined at the time of purchase and the retirement income can be paid out over the life of the user, over a certain period of time, or over a combination of the two. Retirees often purchase a fixed immediate annuity with funds they receive from 401(k) plans, Individual Retirement Accounts ("IRAs"), savings account funds, the cash value or death proceeds from a life insurance policy or proceeds from the sale of a home. The insurer issuing the fixed immediate annuity guarantees payments directly to a user on a monthly, quarterly, semi-annual or annual basis for the life of the user, for a certain period of time, or for some combination of the two. At the time of purchase, the income payments are locked based upon current market interest rates. The user's income payments are determined by, among other things, a combination of the market interest rate, the payment options selected by the user, the premium payment amount and the life expectancy of the user. Once the lump sum premium payment is made, the user has exchanged the lump sum premium payment for a series of guaranteed payments that will not change as a result of market performance. With a fixed immediate annuity, the user does not have any input concerning how the lump sum premium payment is invested.

A variable immediate annuity, like a fixed immediate annuity, guarantees income over the life of the user, for a certain period of time, or for a combination of the two. However, unlike a fixed immediate annuity where the income payments are fixed and do not vary, the income payments received from the variable immediate annuity vary based on market performance. The user could potentially earn more or less on a variable immediate annuity because of the equity investments.

In one embodiment of a process according to the present invention, an insurer is able to combine favorable features of each of the above-described annuities into a single retirement annuity product, i.e., a guaranteed payment stream in a manner similar to a fixed immediate annuity; a guaranteed retirement income amount in a manner similar to a fixed immediate annuity; an upside potential for a return on investment during the accumulation period in a manner similar to a variable deferred annuity; and a potential to realize an increased retirement income amount based on equity market performance in a manner similar to a variable immediate annuity.

In another embodiment, pursuant to a risk mitigation process of the present invention, an insurer may offer a guaranteed minimum retirement income amount to a user by eliminating the inherent economic uncertainties associated with traditional deferred and immediate annuities. By having the user predetermine before purchase of a retirement annuity product a desired retirement date and a predictable premium payment amount and a schedule of premium payments, the insurer is able to lower the cost to the user of the guaranteed minimum retirement income amount.

FIG. 1 is a block diagram illustrating one embodiment of a quoting system 10 for retirement benefits according to the present invention. The quoting system 10 may include a quote calculator 2, an input module 1 and an output module 3. The input module 1 and the output module 3 are shown for illustrative purposes only. In one embodiment, either the input module 1 or the output module 3, or both, may be a part of the quote calculator 2. The quoting system 10 may be used to provide a quote to a user on one or more parameters relating to a purchase or a contract for a retirement annuity product.

The input module 1 may receive information input by a user or an agent on behalf of a user regarding the user and one or more retirement desires of the user. In one embodiment, the input information may include two of a retirement date, a minimum retirement income amount the user would like to receive, or a defined premium payment amount the user would like to make towards the user's minimum retirement income amount. In one embodiment, the input information may include a retirement date, a minimum retirement income amount, a premium payment amount, a current age of the user, a gender of the user, and an indication of whether a retirement annuity will be a joint retirement annuity (i.e., based on two lives) or a single retirement annuity (i.e., based on one life). Additionally, in one embodiment, the input information may include an indication of whether the user would like to add one or more riders to the retirement annuity contract and/or the type of rider(s) to be added. The riders available to the user may include a disability rider, an unemployment rider and an early death rider as described below with reference to FIG. 3.

In one embodiment, an agent or a software program may help the user to determine the retirement date, the minimum retirement income amount the user would like to receive or the defined premium payment amount the user would like to make. In one embodiment, the input module 1 may represent a screen of a software program or a web page.

The quote calculator 2 may include hardware and/or software to calculate retirement account information. Given two of the user's retirement date, the minimum retirement income amount or the defined premium payment amount as inputs, the output module 3 may calculate the other one of the retirement date, a premium payment amount required to meet the user's minimum retirement income amount or the retirement income amount that would be paid to the user based on the defined premium payment amount the user would like to make, depending on the one not input by the user to the input module 1. For example, if the user chooses to input the user's retirement date and the desired minimum retirement income amount, the output of the quote calculator 2 would be the required premium payment amount to achieve the minimum retirement income amount. If the user chooses to input the retirement date and the desired premium payment amount, the output of quote calculator 2 would be the minimum retirement income amount available to the user based on the defined premium payment amounts the user would like to make. However, if the user chooses to input the desired premium payment amount and the minimum retirement income amount, the output of the quote calculator 2 would be the user's retirement date.

In one embodiment, the output of the quote calculator 2 may include a retirement annuity contract. In one embodiment, the user may be presented with a quote for the purchase of a proposed retirement annuity contract including terms meeting the parameters input by the user. The quote may be presented to the user as a web page or another similar type of user interface.

In one embodiment, the quote calculator 2 may base the premium payment amount quote or the minimum retirement income amount quote on an annuity accumulation period defined by the user's retirement date and the date of the quote. In one embodiment, the quote for the minimum retirement income amount will guarantee that the user is paid the minimum retirement income if the user pays the premium payment amount at each of a plurality of predetermined payment intervals, for example, a plurality of monthly payment intervals. In one embodiment, the premium payment amount or the minimum retirement income amount may be calculated by using at least one equity performance factor such as a stock index. Additionally, the minimum retirement income amount may be varied depending on a sales channel pursuant to which a sale of an annuity contract is made. For example, if the sale of the annuity contract was made direct to a consumer (e.g., via an Internet web site) without an agent, an insurer offering such annuity contract can pass its distribution savings realized by virtue of not having to deal with the agent onto the consumer in the form of a higher guaranteed minimum retirement income.

In one embodiment, the output module 3 may also output a cost breakdown including a retirement income amount, a disability income rider charge, an unemployment income rider charge, an early death rider charge, a lump sum equivalent, an interest rate lock period and a buy-down option where the user can buy-down the premium payment amount incrementally. In one embodiment, if the user has a choice of either a paid-up option or a partially paid-up option for the early death rider, the output module 3 may output a quote including each of these options. In another embodiment, the user may input a choice of a type of early death rider and the output module 3 may output only a cost of the type of early death rider chosen by the user.

In one embodiment, the user may input information in a software program or a web page, including a name, an address, a Social Security or tax ID number, a beneficiary, a qualified/nonqualified pension plan, and a 1035 Exchange replacement (i.e., referring to a tax-free exchange pursuant to Section 1035 of the Internal Revenue Code). An output of the quote calculator 2 may include a signature ready application for purchase of the quoted annuity product. The signature ready application may be an electronic signature ready application that may either be printed out and signed or affixed with an electronic signature and submitted over a network, such as the Internet. The output may also include a pre-authorized check approval form pursuant to which a bank or financial institution may automatically withdraw the premium payment amount from the user's account for payment of the premium payment amounts when due. The output may further include a transmittal sheet for transmittal of the completed electronic application to a broker/dealer.

In one embodiment, the retirement income amount or annuity payment may be a joint annuity payment, for example, for a legally married couple. In one embodiment, a minimum retirement income amount may be guaranteed for either a single lifetime period or a joint lifetime period. In another embodiment, the minimum retirement income amount may be guaranteed for a single lifetime period or a joint lifetime period with a predetermined certain period for the annuity payments. The predetermined certain period may be measured from a date at which annuity payments or transmission of the retirement income to the user begins. For example, the predetermined certain period may be a ten year certain period where, if the user of the annuity dies before the end of the predetermined certain period, a beneficiary designated by the user will receive the annuity payment until the end of the predetermined certain period.

In one embodiment, a minimum retirement income amount or the defined premium payment amount may be dependent upon both a mortality rate and an interest rate. In one embodiment, the minimum retirement income amount will be guaranteed independent of the user's employer. Thus, the minimum retirement income amount described herein is fully portable if the user changes employers.

Figure 2:
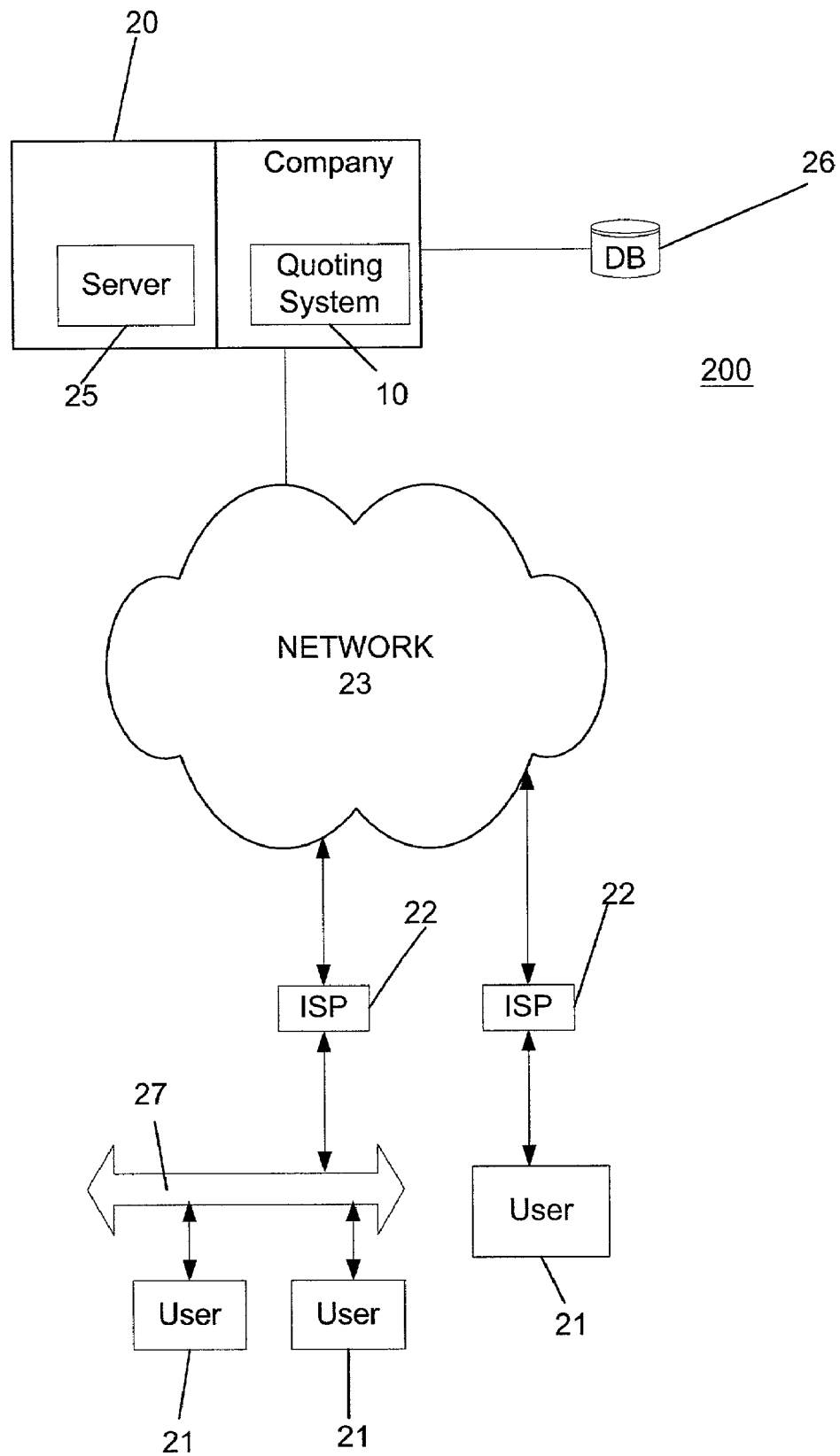
FIG. 2 is a block diagram illustrating one embodiment of an overall system in which the quoting system of FIG. 1 may be implemented.

FIG. 2 is a block diagram illustrating one embodiment of a network 200 in which the quoting system 10 of FIG. 1 may be implemented. In this embodiment, the quoting system 10 may be available to a plurality of users 21 through a network 23, which may be the Internet. The system 200 may include a company site 20, an internet service provider (ISP) 22 and the users 21. The users 21 may communicate with the company site 20 through the network 23. The users 21 may be connected to the network 23 through the ISP 22. In one embodiment, the users 21 may be coupled to the ISP 22 through a communications link 27. In another embodiment, a user 21 may be coupled directly to the ISP 22.

The communications links 23 and 27 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. The communications links 23 and 27 may also include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. The communications links 23 and 27 may further include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Although only three users 21 are shown in FIG. 2, in actual practice, there may be fewer or significantly more users 21 connected to the system 200 than shown. Additional users 21 may be connected through the same ISP 22 shown or through other ISPs 22. However, for purposes of illustration, the discussion will assume the three users 21 connected to the network 23 through the two ISPs 22.

Although any network may be used for the system 200, for the purpose of illustration, the users 21 and the company site 20 may to be connected to the Internet 23. The users 21 may be connected to the ISPs 22 through client computer systems having resident therein at least one user interface (UI) application module. In one embodiment, the UI application module may include an internet browser, such as a Netscape Navigator™ browser or a Microsoft Internet Explorer™ browser. The users 21 may further include an email communication application module, such as a Microsoft Beyond Mail™ application, a Netscape Mail™ application, a Eudora Pro™ application or the like.

The users 21 may be comprised of a personal computer running a Microsoft Windows™ 95 operating system, a Microsoft Windows 98 operating system, a Millenium™ operating system, a Microsoft Windows NT™ operating system, a Microsoft Windows 2000 operating system, a Microsoft Windows™ CE™ operating system, a PalmOS™ operating system, a Unix operating system, a Linux operating system, a Solaris™ operating system, an OS/2™ operating system, a BeOS™ operating system, a MacOS™ operating system, or another similar operating system or platform. The users 21 may also include a microprocessor such as an Intel x86-based device, a Motorola 68K device, a PowerPC™ device, a MIPS device, a Hewlett-Packard Precision™ device, a Digital Equipment Corporation Alpha™ RISC processor, a microcontroller or another general or special purpose device operating under programmed control. The users 21 may further include an electronic memory such as a random access memory (RAM), an electronically programmable read only memory (EPROM), a storage such as a hard drive, a compact disk read only memory (CDROM), a rewritable CDROM or another magnetic, optical or other storage medium, and other associated components connected over an electronic bus, as will be appreciated by persons skilled in the art. The users 21 may also include a network-enabled appliance such as a WebTV™ unit, a radio-enabled Palm™ Pilot or similar unit, a set-top box, a networkable game-playing console such as a Sony Playstation™ console or a Sega Dreamcast™ console, a browser-equipped cellular telephone, or another TCP/IP client or other device.

The users 21 may represent client systems used by customers or users, or agents of the company site 20. The company site 20 may include the quoting system 10, a server 25 and a database 26. The quoting system 10 may be the quoting system 10 of FIG. 1.

The server 25 may include a workstation running the Microsoft Windows™ NT™ operating system, the Microsoft Windows™ 2000 operating system, the Unix operating system, the Linux operating system, a Xenix operating system, an IBM AIX™ operating system, a Hewlett-Packard UX™ operating system, a Novell Netware™ operating system, a Sun Microsystems Solaris™ operating system, the OS/2™ operating system, a BeOS™ operating system, an Apache operating system, an OpenStep™ operating system or another operating system or platform.

Although the database 26 is shown to be outside of the company site 20, the database 26 may reside within the company site 20 in one embodiment. The database 26 may include or interface to an Oracle™ relational database such as that sold commercially by Oracle Corporation. Other databases, such as an Informix™ database, a Database 2 (DB2) database, a Sybase database, an On Line Analytical Processing (OLAP) query format database, a Standard Query Language (SQL) format database, a storage area network (SAN), a Microsoft Access™ database or another similar data storage device, query format, platform or resource may be used.

The database 26 may be used to store one or more algorithms used to calculate the quote for the premium payment amount or the retirement income amount requested by the user 21. The database 26 may also store one or more tables, charts, investment information, information needed to generate web pages, and any other data needed to generate the quote described with reference to the output module 3 of FIG. 1.

Figure 3:
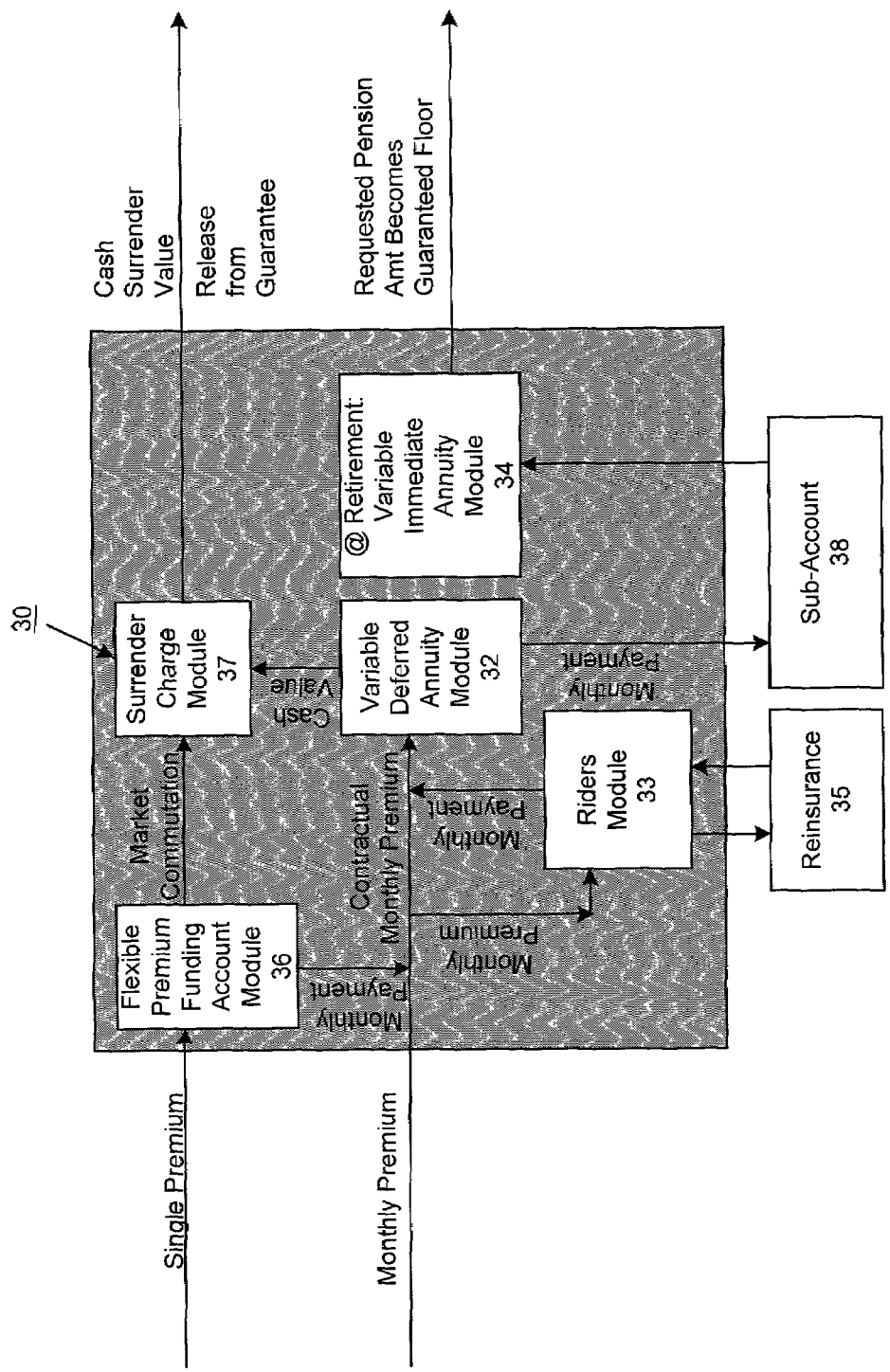
FIG. 3 is a block diagram illustrating one embodiment of a system for providing a user with periodic retirement income payments.

FIG. 3 is a block diagram illustrating one embodiment of a portable guaranteed annuity system 30 for providing a user with a plurality of periodic retirement income payments. In one embodiment, the portable guaranteed annuity system 30 may include a variable deferred annuity ("VDA") module 32 and a variable immediate annuity ("VIA") module 34. One or more premium payments received into the system 30 may be placed into the variable deferred annuity module 32.

As explained above, a variable annuity is a contract in which the premiums paid are invested in one or more stock and bond sub-accounts. A variable annuity account value reflects the performance of the investment funds selected. Over the long-term, premiums invested in equity stock funds generally reflect the growth and performance of the economy and can serve as a hedge against inflation. A deferred annuity contract is generally one in which one or more annuity payouts begin at a future date. An immediate annuity contract is generally one in which annuity payouts begin immediately or within one year. Thus, a variable deferred annuity is generally a variable annuity in which the annuity payouts begin at a future date and a variable immediate annuity is generally a variable annuity in which the annuity payouts begin immediately.

In one embodiment, the premium payments may be received periodically where the period is defined by an annuity contract. For example, the annuity contract may define a monthly periodic premium payment. In one embodiment, the user's contractual monthly premium payment may be paid into a variable deferred annuity account through an electronic funds transfer. In another embodiment, the user may be billed on a periodic basis for the contractual premium payment amount.

In one embodiment, the contractual monthly premium payment may be deposited into a predetermined sub-account 38 of the variable deferred annuity module 32. The predetermined sub-account 38 may mirror a pension fund management style. At completion of a contractual accumulation period, the monetary value invested in the predetermined sub-account 38 may be transferred to the variable immediate annuity module 34 for payout to the user.

If the amount accumulated in the predetermined sub-account 38 is greater than an amount needed for a guaranteed minimum retirement income amount, the company 20 and the user 21 share the excess earnings. Thus, the user 21 may receive an amount greater than the guaranteed minimum retirement income amount during the annuity period. If the amount accumulated in the sub-account 38 is less than the amount required to achieve the guaranteed minimum retirement income amount, the company 20 will pay the user 21 an amount equal to the guaranteed minimum retirement income amount.

In one embodiment, the user 21 may choose one or more riders for inclusion in the annuity contract such as a disability rider, an unemployment rider or an early death rider. Thus, the system 30 may include a riders module 33 to receive a portion of the contractual monthly premium payment to cover any selected riders. In one embodiment, the riders may be administered by a reinsurance entity 35. In one embodiment, if the user 21 elects to include a disability rider in the annuity contract, the user 21 will be obligated to make one or more scheduled monthly rider premium payments for a predetermined period in order that the premium payments will be made from another source in the event of a disability period. If the user 21 elects to include an unemployment rider, the user will be obligated to make one or more scheduled rider premium payments for a predetermined period to ensure that the premium payments will be made from another source in the event the user has an unemployment period. The rider premium payments cannot be transferred or withdrawn from the flexible premium funding account or from the sub-account. The rider premium payments must be paid from another source.

The period of premium payments for either of the disability rider and the unemployment rider may depend on the user's age and the user's age at disability or unemployment. In one embodiment, there may be an elimination period, such as, for example, 90 days before payments may begin. An appropriate rider or another provision may, therefore, be required in order that the premium payments will continue during the elimination period. Payments missed during the elimination period may either have a grace period charge paid by the rider or such a grace period charge may be waived pursuant to the terms of the annuity contract. The premium payments may vary based on at least one of a plurality of factors including an age of the user, a gender of the user, a length of time of the accumulation period, an occupation of the user, and a scheduled premium payment amount.

In one embodiment, the early death rider for annuity contracts with joint owners will pay the remaining monthly premium payments in the event one of the joint owners dies before an annuity payment start date. This is a decreasing term insurance rider that may be issued as a single life annuity contract or a joint life annuity contract.

In one embodiment, the user 21 may choose to pay a single premium which fulfills the total premium payments to be paid over the annuity contractual accumulation period. In this embodiment, the single premium may be deposited into a flexible premium funding account in a flexible premium funding account module 36. In this embodiment, money from the flexible premium funding account may be transferred to the user's variable deferred annuity account in the variable deferred annuity module 32 periodically according to the user's annuity contract. For example, if the user has a contract requiring monthly premium payments, the user's entire monthly premium payment may be transferred to the user's variable deferred annuity account at each of the preset payment intervals.

In one embodiment, the user 21 may choose to pay the defined premium payment amounts at the preset payment intervals through electronic funds transfer. In another embodiment, the user 21 may choose to pay the defined premium payment amounts at the preset payment intervals via manual check and may incur a monthly billing charge.

In one embodiment, each user's flexible premium funding account may be used to buy-down an amount of the user's monthly premium payment. In this embodiment, the same amount will be transferred from the user's flexible premium funding account to the user's variable deferred annuity account every month until the end of the user's contractual accumulation period. Thus, if the user's monthly premium payment amount is $1,000 and the user's flexible premium funding account is used to contribute $300 per month towards payment of that $1,000 monthly premium payment, the user will pay $700 a month in addition to the $300 amount contributed from the user's flexible premium funding account. In this embodiment, the company 20 may notify the user 21 when the user 21 must make new arrangements to make the monthly premium payments. In another embodiment, the user 21 may make more than one single premium payment to the user's annuity account. In such embodiment, each single premium payment made by the user 21 will be put into a separate user account in the flexible premium funding account module 36.

In one embodiment, if the user 21 misses a premium payment and the premium payments are not paid with interest within a predetermined time period, the user may forfeit the contract guarantee of the retirement annuity contact.

In one embodiment, premium payments allocated to be paid from the user's flexible premium funding account may be transferred monthly from the user's flexible premium funding account to the user's variable deferred annuity account based on a predetermined formula for allocation.

In one embodiment, the user 21 may choose to be released early from the annuity contract. In such embodiment, the system 30 may include a surrender charge module 37. The surrender charge module 37 may deduct a surrender charge from a cash value amount of the user's VDA in the variable deferred annuity module 32. The surrender charge may be based upon the length of the annuity contractual accumulation period and a time period remaining left in the contractual accumulation period at a date when the user 21 requests to be released early from the annuity contract.

In one embodiment, if the user 21 has a flexible premium funding account at the time the user 21 requests to be released early from the annuity contract, a market commutation value of the amount in the user's flexible premium funding account will be transmitted to the user 21. In one embodiment, a surrender charge may first be deducted from the market commutation amount in the user's flexible premium funding account. In another embodiment, the market commutation value of the user's flexible premium funding account will not be subject to any surrender charge.

In one embodiment, the user 21 may be allowed to withdraw funds from the user's retirement annuity account. In one embodiment, if withdrawals made from the user's annuity account are not repaid within a predetermined time period, the user's retirement annuity contract may forfeit the contract guarantee. In another embodiment, the withdrawal payments may be subject to surrender charges.

In one embodiment, if the user has a flexible premium funding account, the withdrawals will first be taken from the sub-account. In another embodiment, if the user has a flexible premium funding account. In some cases, withdrawals of this type may be subject to a commutation charge. Withdrawals coming from the user's flexible premium funding accounts may be taken out on a first-in first-out basis, according to one embodiment.

Figure 4:
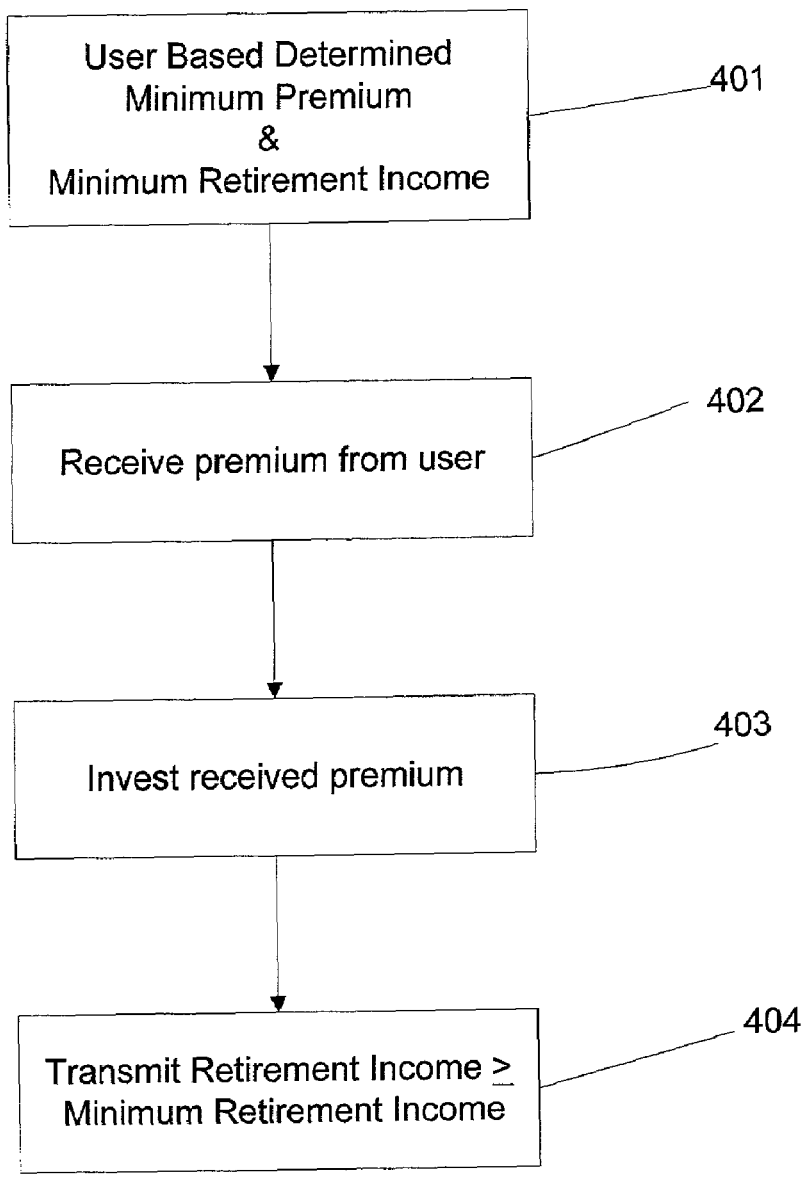
FIG. 4 is a flow diagram illustrating one embodiment of a process for providing a user with periodic retirement income payments.

FIG. 4 is a flow diagram illustrating one embodiment of a process 400 for providing a user 21 with a plurality of periodic retirement income payments. At step 401, the user 21 may input a desired premium payment amount and a minimum retirement income amount in a portable guaranteed annuity system 30.

At step 402, the system 30 receives a premium payment from the user 21. In one embodiment, the step 402 of receiving the premium payment from the user may include a step of receiving a monthly premium payment from the user 21. In one embodiment, the premium payments received from the user 21 may include a premium tax, such as, for example, state-specific charges. In another embodiment, the received premium payment may include a monthly billing charge for billing the user 21. In yet another embodiment, the premium payments received from the user 21 may include premium payments associated with riders. At step 403, the system 30 invests the received premium payment.

At step 404, the system 30 may transmit the accumulated retirement income to the user 21. In one embodiment, the step 404 of transmission of the retirement income may include a step of placing at least a portion of the user's account value accumulated in the variable deferred annuity module 32 into the variable immediate annuity module 34.

The step 404 of transmission of the accumulated retirement income to the user 21 may begin at a user-defined annuity payment start date. In one embodiment, the annuity payment start date may be required to be at least ten years after an annuity contract start date. Until then, the premium payments remain invested in a variable deferred annuity. The form of the variable immediate annuity once payments begin and parameters relating to the user 21 upon which it is based must be determined at the contract start date. In one embodiment, the form of the VIA may not be changed. In another embodiment, the form of the VIA may be changed but the user 21 may forfeit the contract guarantee.

In one embodiment, the form of the VIA may be changed in relation to legal marriages and qualified domestic relation orders (QDROs) relating to the user. These changes may include 1) a single user/annuitant may be allowed to add a spouse to the VIA if the marriage occurs after the contract start date, in which case the benefit may be recalculated; and 2) if the spousal joint owner/annuitants get divorced after issue and the contract is split by a QDRO, the company may split the contract into two single contracts proportionally (benefits, premiums and contract values).

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A process for providing a user with a plurality of periodic retirement income payments comprising the steps of:

receiving one or more premium payments from the user during an accumulation period;

investing the received premium payments in an account in a manner consistent with one or more predefined objectives during the accumulation period and a payment payout period to realize a retirement income amount; and transmitting the retirement income amount to at least one of the user and a designated receiver at a designated time after the end of the accumulation period, wherein the retirement income amount includes a predetermined guaranteed minimum retirement income amount if the received premium payments are received according to a predetermined premium payment schedule, and wherein one of the predetermined guaranteed minimum retirement income amount and a premium payment amount is defined by the user.

2. The process of claim 1 wherein the retirement income amount is an amount greater than the predetermined guaranteed minimum retirement income amount.

3. The process of claim 1 wherein the step of receiving the premium payments includes the step of receiving the premium payments in a plurality of predefined interval payments during the accumulation period.

4. The process of claim 3 wherein the step of receiving the premium payments in the plurality of predefined interval payments includes the step of receiving a plurality of monthly payments during the accumulation period.

5. The process of claim 3 wherein the step of receiving the premium payments in the plurality of predefined interval payments includes the step of receiving a late payment within a grace period after an interval payment was due.

6. The process of claim 5 wherein the step of receiving the late payment within the grace period includes the step of receiving the late payment along with an interest payment for the time between when the interval payment was due and the time when the late payment is received wherein the interest payment is calculated based on a predefined interest rate.

7. The process of claim 6 wherein the step of receiving the premium payments includes the step of receiving at least a portion of one of the premium payments in an amount greater than a predefined interval payment and converting the portion of the one of the premium payments into the predefined interval payment.

8. The process of claim 7 wherein the step of converting the portion of the premium payments includes the step of placing the portion of the premium payments in a flexible premium funding account and transferring a predefined interval payment to the account after each predefined interval until the flexible premium funding account is empty.

9. The process of claim 7 wherein the step of converting the portion of the premium payments includes the step of placing the portion of the premium payments in a flexible premium funding account and transferring a predefined portion of the predefined interval payment to the account after each predefined interval until the end of the accumulation period.

10. The process of claim 1 wherein the step of receiving the premium payments includes the step of receiving the premium payments from the user during employment at a first employer during at least a part of the accumulation period.

11. The process of claim 1 wherein the step of receiving the premium payments includes the step of receiving the premium payments from an insurance policy in a 1035 tax-free exchange.

12. The process of claim 10 wherein the step of receiving the premium payments includes the step of receiving the premium payments from the user during employment at a second employer during at least a part of the accumulation period in which the user is not employed at the first employer.

13. The process of claim 1 wherein the user comprises two individuals, each premium payment comprises a joint premium payment, the predetermined guaranteed minimum retirement income amount comprises a joint guaranteed minimum retirement income amount and the retirement income amount comprises a joint retirement income amount.

14. The process of claim 13 further comprising the step of dividing the premium payment, the predetermined guaranteed minimum retirement income amount and the retirement income amount proportionally wherein each of the two individuals is assigned a proportionally split premium payment, a proportionally split predetermined guaranteed minimum retirement income amount and a proportionally split predetermined retirement income amount.

15. The process of claim 14 further comprising the step of adding a second user after receiving at least a portion of the premium payments to create a joint premium payment amount, a joint guaranteed minimum retirement income amount and a joint retirement income amount shared by both individuals.

16. The process of claim 1 wherein the step of transmitting the retirement income amount includes the step of transmitting the retirement income amount for a period encompassing at least one of a life of the user and a certain time period.

17. The process of claim 1 further comprising the step of transmitting a commuted value of at least a portion of the received premium payments and an invested premium payment to the user before the end of the accumulation period in response to a request by the user, wherein the commuted value is adjusted to include a discounting impact of an investment return on the invested premium payment and an appropriate predetermined surrender charge.

18. The process of claim 17 wherein the step of receiving the premium payments further comprises the steps of receiving a rider selection from the user and calculating the other of the predetermined guaranteed minimum retirement income amount and the premium payment based on the user's rider selection.

19. The process of claim 18 wherein the step of receiving the rider selection includes the step of receiving a selection of at least one of a disability rider, an unemployment rider and an early death rider.

20. A process for providing a user with periodic retirement income payments comprising the steps of:
- receiving an input including two of a retirement date, a minimum retirement income amount and a defined premium payment amount for payment at each of a plurality of preset payment intervals;
- calculating the other one of the retirement date, the minimum retirement income amount and the premium payment amount based on the input for an accumulation period defined by the retirement date and a current age of the user;
- receiving a plurality of premium payments from the user during the accumulation period;
- investing the received premium payments in an account in a manner consistent with one or more predefined objectives during the accumulation period to realize a retirement income amount; and
- transmitting the retirement income amount to at least one of the user and a designated receiver at a designated time after the end of the accumulation period wherein the retirement income amount includes a predetermined guaranteed minimum retirement income if the received premium payments are received according to a predetermined premium payment schedule, and wherein one of the predetermined minimum retirement income amount and the premium payment amount is defined by the user.

21. The process of claim 20 wherein the step of calculating the premium payment amount includes the step of calculating the premium payment amount using at least one equity performance factor.

22. A process for investment comprising the steps of:
- receiving a premium payment amount from a user at each of a plurality of predefined intervals over an accumulation period during employment at a first employer during a first part of the accumulation period;
- receiving the premium payment amounts from the user during employment at a second employer during a second part of the accumulation period;
- investing the received premium payment amounts during the accumulation period; and
- transmitting a retirement income amount to at least one of the user and a designated receiver at a designated time after the end of the accumulation period, wherein the retirement income amount includes a predetermined guaranteed minimum retirement income amount if the total received premium payment amounts were received according to a predetermined premium payment schedule, and wherein one of the predetermined guaranteed minimum retirement income amount and the premium payment amount is defined by the user.

23. A system for providing a user with a plurality of periodic retirement income payments comprising:
- a variable deferred annuity module to receive a predetermined premium payment from the user at each of a plurality of predetermined payment intervals to invest the premium payments and to output an income generating payment; and
- a variable immediate annuity module to receive the income generating payment and to output a periodic retirement income payment amount wherein the periodic retirement income payment amount is greater than or equal to a predetermined guaranteed minimum periodic retirement income payment amount if the premium payments received are received according to a predetermined premium payment schedule, and wherein one of the predetermined minimum periodic retirement income payment amount and a premium payment amount is defined by the user.

24. The system of claim 23 further comprising a flexible premium funding account module means to invest a received premium payment into a user flexible premium funding account and to output one of a predetermined premium payment and a portion of a predetermined premium payment to the variable deferred annuity module.

25. The system of claim 23 further comprising a surrender charge module to receive as a surrender input at least one of a cash value of the invested premium payments from the variable deferred annuity module and a market commutation value or an assignment value of the flexible premium funding account from the flexible premium funding account module, to add an appropriate surrender charge to the surrender input and to output a cash surrender amount to the user in response to the received surrender input.

* * * * *